United States Patent [19]

Babbitt et al.

[11] Patent Number: 4,516,752
[45] Date of Patent: May 14, 1985

[54] MECHANICALLY PRELOADED PACKING ASSEMBLY

[75] Inventors: Brett A. Babbitt, Katy; Tri C. Le, Missouri City, both of Tex.

[73] Assignee: Joy Manufacturing Company, Pittsburgh, Pa.

[21] Appl. No.: 570,110

[22] Filed: Jan. 12, 1984

[51] Int. Cl.³ ................................ F16K 31/44; F16J 15/00
[52] U.S. Cl. ................................ 251/214; 277/110; 277/116.2; 277/117; 277/125
[58] Field of Search ............... 251/214; 277/110, 111, 277/116.2, 117–122, 123, 125

[56] References Cited

U.S. PATENT DOCUMENTS

| | | | |
|---|---|---|---|
| 3,179,426 | 4/1965 | Duer | 277/117 |
| 3,284,089 | 11/1966 | Wrenshall | 277/125 |
| 4,169,604 | 10/1979 | Heathcott | 277/125 |
| 4,262,690 | 4/1981 | Binegar | 277/117 |
| 4,340,204 | 7/1982 | Herd | 251/214 |

*Primary Examiner*—A. Michael Chambers
*Attorney, Agent, or Firm*—Marvin J. Marnock; David A. Warmbold

[57] ABSTRACT

A pressure energized mechanically preloaded packing assembly (48, 68) of a high pressure gate valve (10). The packing assemblies are positioned in an annular space about the valve stems (36, 64) for sealing between the valve stems and bonnet (38) or valve body (12). The packing assemblies include an energizer ring (78) which is positioned within the annular space having an outwardly facing precision cut frusto-conical end surface (82) relative to the flow passage (16, 18) of the valve. A plurality of Belleville springs or spring washers (98) with a generally frusto-conical shape are positioned adjacent and in concave relation to the outer end (82) of the energizer ring. The cone angle of the spring washers are smaller than the cone angle of the energizer ring. The packing assembly further includes at least one packing ring set positioned outside the spring washers (106, 108) which includes a stack of plastic packing elements (110) which are sandwiched between a pair of retainer rings (112, 114). A packing gland nut (118) is disposed in contiguous relation to the packing ring set and is externally threaded for accommodating its connection with the valve body whereby the gland nut is axially adjustable to apply axial pressure on the packing ring set and spring washers. The spring washers (98) are compressed until their cone angle matches the cone angle of the energizer ring (78) such that the spring washers exert a predetermined preload onto the packing ring set to provide a low pressure seal between the stem and valve body.

6 Claims, 2 Drawing Figures

MECHANICALLY PRELOADED PACKING ASSEMBLY

BACKGROUND OF THE INVENTION

This invention relates to a mechanically preloaded packing assembly and, deals more particularly with a precision mechanically preloaded packing assembly utilizing Belleville springs or spring washers to energize a packing ring in a high pressure gate valve to provide an adequate seal between the stem and appropriate valve parts at both high and low pressures.

Heretofore, valves have been called upon to handle increasingly higher pressures, particularly valves which are used in the oil and gas industry where the trend has been toward deeper wells in which pressures up to 30,000 psi and above are encountered. Valves must also contend with noxious substances such as hydrogen sulfide gas which can pose serious environmental dangers if permitted to leak. Furthermore, the valves are often exposed to high temperature fluids which can cause thermal distortion of the valve and the various components thereof, including the packing assemblies.

The various types of packing materials and valve stem packing arrangements that have been proposed or used in the past for high pressure applications or applications where the valve is subjected to handling wide pressure variations or harmful noxious or toxic substances have not been entirely satisfactory. Such a high pressure packing assembly is shown in U.S. Pat. No. 4,262,690 to Binegar which utilizes a plurality of plastic packing retainer rings which are then urged together by fluid pressure to squeeze the packing elements firmly against the stem and corresponding body part to seal therebetween.

However, in the assembly of valves, it is frequently important that the packing assemblies be placed in a preloaded condition prior to use in order that a seal can be established at low fluid pressures as the pressure builds as well as at high pressures. In mechanically preloaded packing assemblies which utilize Belleville springs or spring washers to provide the preload tolerance stack up resulting from manufacturing variances of the metal parts of the valve presents a problem because a varying number of such springs must be employed depending on the degree of manufacturing variance present in the particular valve body. The determination of the proper number of such springs is a tedious and time consuming process and when performed by field personnel can lead to hazardous errors. Oftentimes it is necessary to stack different sets of Belleville springs 180 degrees with respect to one another within a single packing assembly so that a greater spring washer deflection can be obtained while maintaining the same axial load acting on the packing elements. However, such multiple use of spring washers makes it extremely difficult to determine the precise preload exerted on the packing elements due to the difficulty in ascertaining the exact deflection of the spring washers upon energization of the packing assembly. Also spring washers can be over deflected beyond the elasticity of the metal parts which will then destroy the preloading capacity of the washers. Furthermore, such non-uniformity and multiplicity of spring washers adds to the manufacturing costs of the valve.

SUMMARY OF THE INVENTION

Accordingly, it is an object of this invention to provide an improved mechanically preloaded high pressure packing assembly which overcomes the aforementioned disadvantages of the prior art devices.

Another object of the present invention is to provide an improved mechanically preloaded packing assembly utilizing a fixed limited number of annular springs to energize or preload the packing assembly such that the degree of deflection of the spring washers and, consequently, the amount of preload acting on the packing assembly is strictly controlled with premeasured accuracy.

Still another object of the invention is to provide an improved mechanically preloaded packing assembly which minimizes the tolerance stack up problem resulting from manufacturing variances such that only one set of spring washers is required to preload the packing assembly.

A further object of the invention is to provide a mechanically preloaded packing assembly which utilizes a fixed limited number of spring washers for applying a premeasured axial load to the packing assembly independently of the variable axial dimensions of the valve body parts as results from stacking of manufacturing tolerances such that it is unnecessary to strictly control such valve body tolerances resulting in manufacturing savings while maintaining high manufacturing quality of the valve.

A still further object of the invention is to provide an improved mechanically preloaded packing assembly which can be easily energized into its preloaded condition in the field by service personnel.

The present invention is directed to a mechanically preloaded packing assembly which is particularly adapted for sealing between the bonnet part of the valve body and the valve operating stem and between the valve body and the balancing stem at both high and low pressures. Each packing assembly is disposed in an annular space about the respective valve stems which terminate in an outwardly facing shoulder relative to the flow passage of the valve. The packing assembly includes an energizer ring disposed within the annular space having an inwardly facing end surface in contiguous relation to the outwardly facing shoulder and having a precision cut outwardly facing frusto-conical end surface. A plurality of metal Belleville springs or spring washers are positioned adjacent the energizer ring. The spring washers have a frusto-conical shape being defined by a cone angle smaller than the cone angle of the energizer ring end surface and are positioned in a dished relationship thereto. The packing assembly includes at least one packing ring set which has a stack of packing elements which may be formed of a plastic material such as poly tetrafluoroethylene or the like. The packing elements are sandwiched between a pair of packing retainer rings wherein the inner such retainer ring relative to the flow passage of the valve is in contiguous relation with the outer surface of the spring washers. The annular space is closed by an annular packing gland nut screwed into the annular space far enough to flatten out the spring washer such that the cone angle of the washer is equal to the cone angle of the energizer ring end surface. As a result, the spring washers apply a precisely measured preload onto the packing ring set such that the packing assembly adequately seals at both low pressures as well as high pressures.

Since the degree of deflection of the spring washers is strictly controlled by the precision cut cone angle of the frusto-conical energizer ring end surface, the amount of preload applied directly to the packing ring set can be measured and controlled by varying the number of spring washers used to preload the packing ring set. Furthermore, the present invention dispels the possibility of over deflection of the spring washers since the washers cannot deflect to any greater degree than the cone angle of the precision cut energizer ring. For increased protection against leakage, sealant injection passages are provided in the bonnet and valve body so that a secondary sealing substance can be injected into the energizer ring for emergency sealing.

BRIEF DESCRIPTION OF THE DRAWINGS

In the accompanying drawings which form part of the specification and are to be read in conjuction therewith.

DETAILED DESCRIPTION OF THE INVENTION

Figure 1:
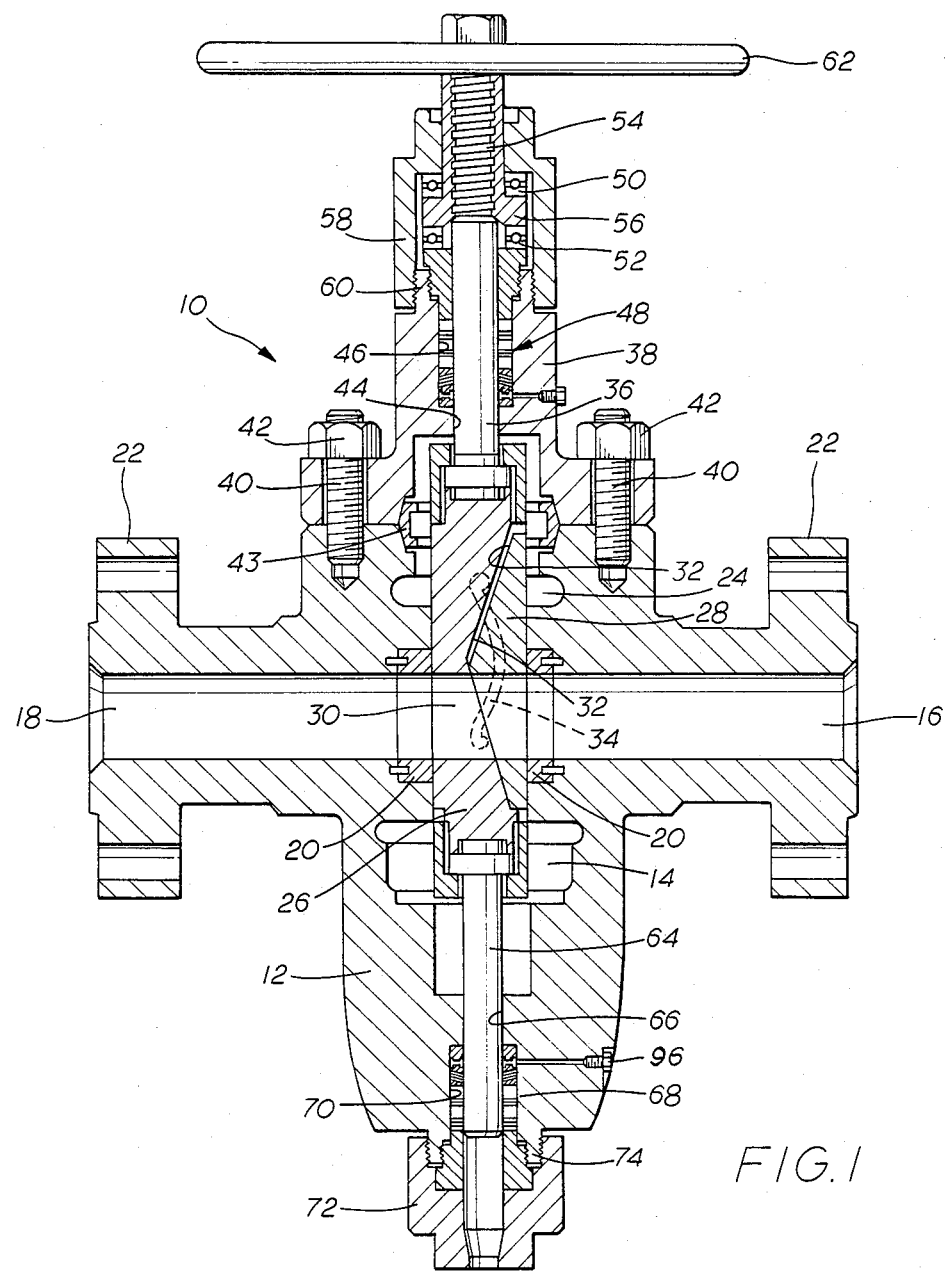
FIG. 1 is a sectional view of a high pressure balanced stem gate valve which is provided with a pair of the mechanically preloaded packing assemblies of the present invention.

Referring now to the drawings for a better understanding of the invention and initially to FIG. 1, numeral 10 generally designates an expanding gate valve which is intended to be used primarily in critical service for handling high pressure fluids up to 30,000 psi. Valve 10 illustrates a typical application of the mechanically preloaded packing assembly of the present invention. Valve 10 includes a valve body 12 having a valve chamber 14 therein. An inlet flow passage 16 and an outlet flow passage 18 communicate with valve chamber 14 to form a flow way through the valve. A pair of valve seats 20 are mounted about the inlet and outlet flow passages 16 and 18, respectively, adjacent valve chamber 14. Flanges 22 on the ends of the valve body 12 may be suitably connected to a pipeline or other flow system as is well known in the art.

An expanding gate assembly 24 is mounted in valve chamber 14 for sliding movement transversely of the flow passages 16 and 18 to open or close the flow way through valve 10. Gate assembly 24 includes a gate 26 and segment 28 which cooperate with one another to expand and contract the gate assembly. In the open position of the gate assembly shown in FIG. 1, gate 26 and segment 28 cooperate to present a port 30 which is aligned with flow passages 16 and 18 in order to permit fluid flow through the valve. When gate assembly 24 is moved downwardly to the closed position (not shown), port 30 is offset from the flow way and the gate assembly prevents fluid flow through the valve. Gate 26 and segment 28 have adjacent inclined surfaces 32 which act against one another in camming fashion to expand gate assembly 24 firmly against seats 20 in both the fully open and fully closed positions of the valve. The gate assembly 24 is induced to expand in the open and closed positions by suitable stops (not shown) in the valve chamber 14 which limit the vertical movement of the segment 28 relative to the gate 26. A pair of bow springs 34 collapse gate assembly 24 away from seats 20 when the gate assembly is moving between its open and closed positions. Bow springs 34 are fixed to the sides of the gate assembly and bias the gate assembly towards a collapsed condition wherein the segment 28 moves toward the gate 26. Accordingly, when in transit between the open and closed positions the gate assembly 24 is in the collapsed condition and valve chamber 14 is exposed to flowline pressure.

Gate assembly 24 is carried between the open and closed positions by an operating stem 36 which is connected at its lower end with the upper portion of gate 26. A bonnet 38 is secured to valve body 12 by a plurality of threaded studs 40 and nuts 42. A seal element 43 provides a seal between bonnet 38 and valve body 12. Bonnet 38 has a bore 44 through which stem 36 extends. The bonnet bore 44 has an enlarged bore portion near its upper end as indicated at 46 to provide an annular space about stem 36 in which a packing assembly 48 is mounted. Packing assembly 48 provides a seal between stem 36 and bonnet 38 which forms a part of the present invention to be described in more detail below.

Immediately above packing assembly 48, there is supported a thrust bearing assembly including upper and lower thrust bearings 50 and 52, respectively, and a sleeve 54 which is threaded onto the top end of stem 36. The sleeve 54 has an enlarged flange 56 on its bottom end which is located between the upper and lower bearings 50 and 52. The upper bearing 50 is supported on the upper annular surface of flange 56 and the lower surface of flange 56 rests atop the lower bearing 52 which, in turn, is resting on the packing assembly 48. A bearing housing 58 is secured to an upstanding neck portion 60 on the top end of bonnet 38. Lubrication of bearings 50 and 52 may be achieved by injecting lubricant through a passage (not shown) extending through bearing housing 58 and sleeve 54. Sleeve 54 extends up through bearing housing 58 and may be equipped with a handwheel 62 on its upper end which may be turned to axially reciprocate stem 36 in order to move gate assembly between the open and closed positions of the flow way.

Valve 10 is adapted for high pressure service and is thus equipped with a balancing stem 64 which is connected with the lower end of gate 26 in coaxial alignment with the operating stem 36. The balancing stem 64 extends through a bore 66 provided in the lower end of valve body 12. A packing assembly 68 identical to that of packing assembly 48 is received in an enlarged bore portion 70 of body bore 66 surrounding balancing stem 64 to provide a fluid-tight seal between the balancing stem 64 and the valve body 12. A bottom cover 72 is secured to a neck portion 74 projecting from the bottom of valve body 12 to enclose and protect the bottom of packing assembly 68.

Since the two packing assemblies 48 and 68 are identical, only the lower packing assembly 68 will be described in detail. Accordingly, referring particularly to FIG. 2, the lower enlarged body bore portion 70, which forms an annular space identical in size and shape to the annular space in the enlarged bonnet bore portion 46, is shown receiving the mechanically preloaded packing assembly of the present invention. The annular space terminates at its inner or upper end in a flat annular shoulder 76 formed within body bore 70 to face generally outwardly or downwardly. As used herein, the term "inner" applies to an element near the flow way through the valve and "outer" applies to an element more remote from the flow way through the valve. The packing assembly includes an energizer ring 78 which has a flat inwardly facing annular end surface 80 positioned against shoulder 76 and a frusto-conical outwardly facing annular end surface 82. The energizer ring 78 surrounds stem 64 and has coaxial inside and outside walls 84 and 86, respectively, relative to the central axis of the ring 78. A plurality of ports 88 extend radially through ring 78 intermediate annular end surfaces 80 and 82 to communicate between coaxial inside and outside peripheral grooves 90 and 92 formed in the side walls 84 and 86, respectively, surrounding stem 64. When the ring 78 is positioned within the valve, the grooves 90 and 92 and ports 88 are in communication with a lubricant injection passage 94 which leads exteriorly to the valve to permit a secondary sealing substance to be injected into the packing assembly 68, if the valve is leaking in the field. The passage 94 is normally sealed by a plug 96. The energizer ring 78 further includes a pair of seal rings 93 and 95 positioned within seal grooves 97 and 99, respectively, formed on side walls 84 and 86, respectively, and located between annular end surface 80 and ports 88 to prevent the secondary sealing substance, if used, from communicating with the inner areas of the valve body.

A plurality of spring washers or Belleville springs 98 having a generally frusto-conical shape are positioned adjacent the frusto-conical end surface 82 of ring 78 surrounding the stem 64. The frusto-conical shape of the spring washers 98 is defined by a cone angle of a smaller degree than the cone angle of the energizer ring 78. An outer space adapter ring 100 is positioned immediately adjacent the spring washers 98 surrounding the stem 64. The adapter ring 100 has an inwardly facing frusto-conical end surface 102 which matches the cone angle of the frusto-conical energizer ring end surface 82 and includes a flat outwardly facing annular end surface 104.

Figure 2:
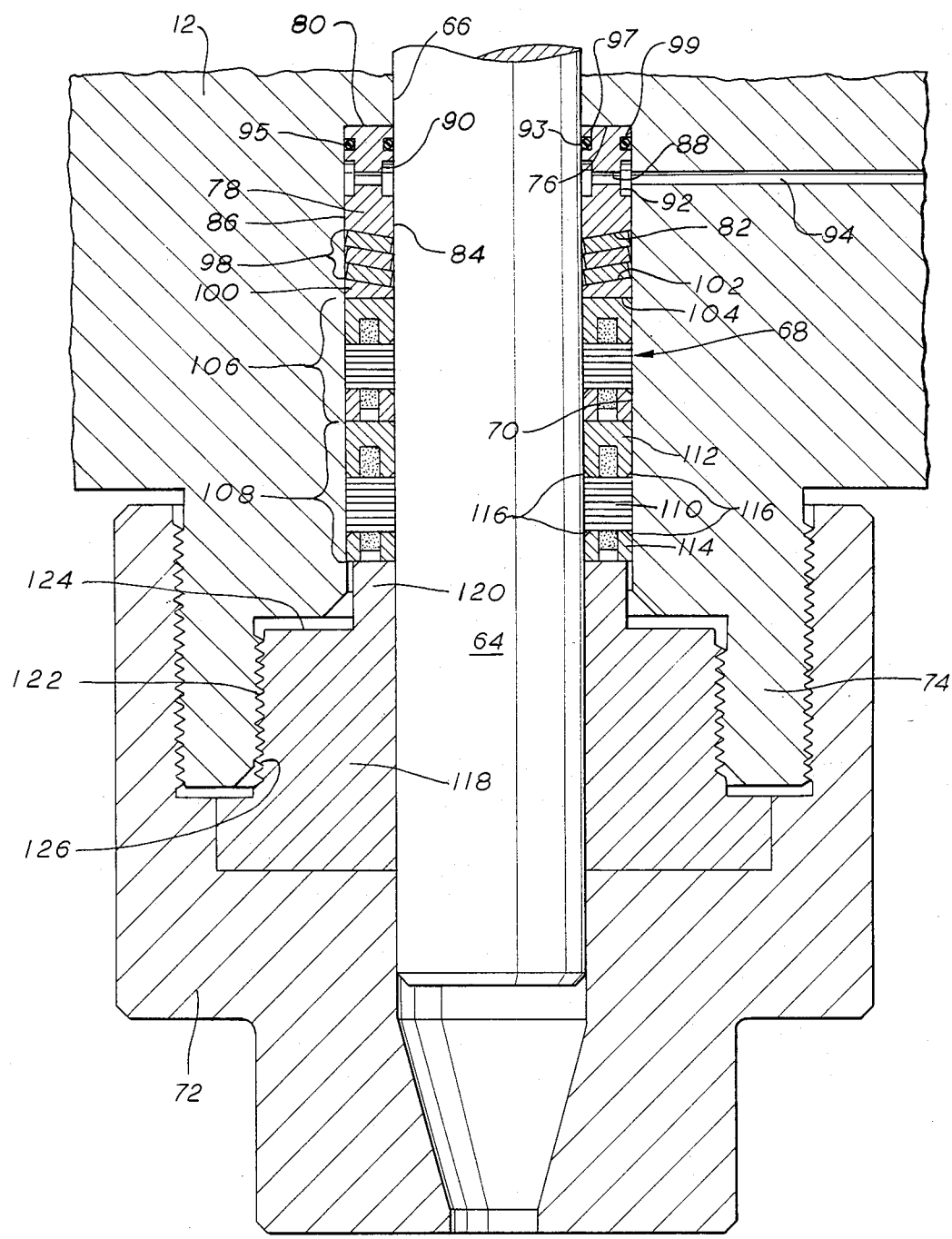
FIG. 2 is a fragmentary sectional view on an enlarged scale of the lower end of the valve shown in FIG. 1 and shows details of the present invention.

The packing assembly 68 further includes first and second packing ring sets 106 and 108, respectively, which are positioned within the annular space adjacent the outwardly facing end surface 104 of adapter ring 100. The packing ring sets 106 and 108 are identical wherein each set includes a plurality of packing elements 110 which are arranged against one another in a stack about stem 64. Packing elements 110 may be formed of any suitable material and are preferably a polymeric substance such as polytetrafluoroethylene, polymide, polyphenylene sulfide, perfluoroalkoxy, or a similar material. Such plastic materials have desirable sealing properties and are able to intimately contact the metal stem 64 and valve body 12 even when there has been galling or other surface damage. The stack of packing elements 110 is sandwiched between a pair of inner and outer hard metal retainer rings 112 and 114, respectively. The inner retainer ring 112 of the first packing ring set 106 rests adjacent the adapter ring end surface 104 and the outer retainer ring 114 of the first packing ring 106 contacts the inner retainer ring 112 of the second packing ring set 108. The packing ring sets 106 and 108 disclosed herein are the subject of U.S. Pat. No. 4,262,690 to Binegar, the entire disclosure of which is incorporated by this reference. As best seen in FIG. 2, it will be noted that the packing ring sets 106 and 108 are depicted as including a plurality of metal chamfer rings 116 which are adapted to prevent extrusion of the packing elements 110. These rings 116 are triangular in radial cross-section and are arranged as shown in U. S. Pat. No. 4,262,690 wherein pairs of chamfer rings are mounted adjacent each set of packing elements 110 with one set engaging the surface of the stem 64 and the other set engaging the wall of bore portion 70. While these rings 116 are not required in this invention relating to a mechanically preloaded packing assembly, they are desirable for use with most types of packing assemblies. To accommodate the chamfer rings 116, the inside and outside annular edges of the retainer rings 112 and 114 must be beveled to provide camming surfaces whereby the chamfer rings are cammed to expand radially into tight engagement with the valve stem and bore wall as axial loading is applied to the packing assembly. Accordingly, the chamfer rings operate to prevent extrusion of the packing elements. This arrangement would be desirable for use at very high valve chamber pressures such as 30,000 psi or greater.

The mechanically preloaded packing assembly structure of the present invention is held in place within the enlarged bore portion 70 by a packing gland nut 118. The packing gland nut 118 includes an inner end portion 120 which is received within the enlarged bore portion 70 in contiguous relationship with the outer retainer ring 114 of the second packing ring set 108. The packing gland nut 118 is further provided with an enlarged externally threaded portion 122 defining an inwardly facing annular shoulder 124. The packing gland nut 118 is threaded onto an internally threaded portion 126 formed in the neck portion 74 of valve body 12.

When the spring washers 98 are in their non-energized position (not shown) with the packing gland nut 118 not completely screwed into the gate valve, there is a space between the spring washers 98 and energizer ring 78 and adapter ring 100 due to the difference in cone angles between the unflexed spring washers 98 and the frusto-conical end surfaces 82 and 102 of the energizer ring 78 and adapter ring 100, respectively. However, upon energization of the mechanically preloaded packing assembly by completely threading packing gland nut 118 into the valve the spring washers 98 conform or deflect to match the cone angles of the frusto-conical end surfaces 82 and 102 of the energizer ring 78 and adapter ring 100, respectively. Accordingly, the spring washers 98 apply a preload directly onto the packing ring sets 106 and 108 to slightly extrude the packing elements 110 to provide a low pressure seal between the valve stem 64 and enlarged body bore 70. The packing gland nut 118 is designed and the valve body parts dimensioned so that the spring washers 98 will deflect to match the precision cut frusto-conical end surfaces 82 and 102 before the annular shoulder 124 contacts any metal body parts of the gate valve. Therefore, the particular manufacturing tolerances of the valve body parts will not effect the degree of deflection or amount of load generated by the spring washers 98 because the spring washers are always deflected to match the precision cut energizer ring 78 and adapter ring 100. In this manner the amount of preload generated by the spring washers can be measured and controlled as a function of the known deflection value of the spring washers 98 and the number of spring washers used within the packing assembly. If a greater preload is required due to the type of packing elements used within the packing assembly, the number of spring washers can be increased until the appropriate load factor is obtained.

Furthermore, the use of the energizer ring 78 prevents overloading or over deflection of the spring washers 98. In the prior art, spring washers were often flip-flopped so as to allow for greater deflection of the washers without increasing the preload. However, the washers were subject to being over deflected beyond the elasticity of the metal contained therein which destroyed the preloading capacity of the spring washers. In the mechanically preloaded packing assembly of the present invention the spring washers cannot be deflected beyond the known cone angle of the energizer ring 78.

While the foregoing description of a preferred embodiment of the invention has been presented for purposes of illustration and description, it is not intended that the invention be limited to the precise form disclosed. For example, the number of Belleville springs or spring washers used in the packing assembly may be varied to match the amount of preload desired. Furthermore, the cone angle of the energizer ring 78 and adapter ring 100 may vary depending on the maximum deflection value of the spring washers or the amount of preload required to preload the packing elements. In addition, the application of the invention need not be limited to gate valves, but is extendable to any type of valve and any application where there is need for sealing about a shaft. It is to be appreciated, therefore, that changes in details of the illustrated construction may be made by those skilled in the art within the scope of the appended claims without departing from the spirit of the invention.

What is claimed is:

1. An improved mechanically preloaded packing assembly in a valve of the type having a valve body with a fluid flow passage therethrough, a valve member mounted for movement between an open position and a closed position relative to the flow passage, and a movable valve stem connected with the valve member to effect movement thereof between the open and closed positions, the valve body receiving the valve stem and defining an annular space about the stem terminating in a shoulder facing outwardly away from the flow passage, the improvement comprising:

an energizer ring positioned within the annular space surrounding the valve stem in contiguous relation to the outwardly facing shoulder, the energizer ring having an outwardly facing frusto-conical end surface;

a spring means having at least one metal spring washer in contiguous relation to the other end surface of the energizer ring and having an outwardly facing frusto-conical shape being defined by a cone angle smaller than the cone angle of the energizer ring end surface;

a packing ring means positioned within the annular space arranged in contiguous relation to the spring washer and disposed closely around the stem to effect a high pressure seal between the stem and the valve body; and a packing gland nut disposed in contiguous relation to the outer end of the packing ring means, the packing gland nut being provided with external threads for accommodating its connection with an internally threaded section of the valve body, the packing gland nut being axially adjustable within the annular space of the valve body for applying an axial force on the packing ring means and spring means until the cone angle of the spring washer matches the cone angle of the energizer ring whereby the spring means applies a predetermined load unto the packing ring means such that the packing ring means is sufficiently preloaded to effect a low pressure seal between the stem and valve body.

2. An improved mechanically preloaded packing assembly as recited in claim 1, further comprising:

an adapter ring disposed about the valve stem within the annular space and positioned between the spring means and the inner end of the packing ring means, the adapter ring having an inwardly facing frusto-conical end surface relative to the flow passage of the valve having a cone angle generally equal to the cone angle of the energizer ring end surface whereby upon threading of the packing gland nut onto the valve body the spring washer is compressed between the matching frusto-conical end surfaces of the energizer ring and adapter ring to evenly spread the preload force acting on the packing ring means over the total cross-sectional surface area of the adapter ring and packing ring means.

3. An improved mechanically preloaded packing assembly as recited in claim 2, in which the spring means comprises a plurality of spring washers disposed in contiguous relation between the energizer ring and adapter ring.

4. An improved mechanically preloaded pacing assembly as recited in claim 2, in which the packing ring means comprises:

a plurality of packing elements arranged in a stacked coaxial relationship in contiguous relation about the valve stem to effect a seal between the stem and the valve body; and a pair of retainer rings disposed about the stem between which the packing elements are sandwiched, one of the retainer rings being an inner retainer ring having an inwardly facing annular surface upon which the axial preload of the spring washer and the fluid pressure from the flow passage acts so that the retainer rings are urged toward one another to squeeze the packing elements against the stem and the valve body thereby providing a low pressure seal as well as increasing the effectiveness of the seal between the stem and valve body created by the packing elements as the fluid pressure in the flow way increases.

5. An improved mechanically preloaded packing assembly as recited in claim 4, in which the packing ring means comprises two sets of packing elements each sandwiched between a pair of retainer rings, the inner retainer ring of the first set of packing elements in contiguous relation to the adapter ring and the outer retainer ring of the second set of packing elements being in contiguous relation to the inner end of the packing gland nut.

6. An improved mechanically preloaded packing assembly in a valve of the type having a valve body with a fluid flow passage therethrough, a valve member mounted for movement between an open position and a closed position relative to the flow passage, and a movable valve stem connected with the valve member to effect movement thereof between the open and closed position, the valve body receiving the valve stem and defining an annular space about the stem terminating in a shoulder facing outwardly away from the flow passage, the improvement comprising:

an energizer ring positioned within the annular space surrounding the valve stem in contiguous relation to the outwardly facing shoulder of the valve body, the energizer ring having an outwardly facing frusto-conical end surface relative to the flow passage of the valve;

a plurality of metal spring washers adjacent the outer end surface of the energizer ring and having a frusto-conical shape being defined by a cone angle smaller than the cone angle of the energizer ring end surface, the spring washers being positioned in concave relationship to the energizer ring end surface;

an adapter ring disposed about the valve stem within the annular space and positioned outside the spring washers relative to the flow passage of the valve, the adapter ring having an inwardly facing frusto-conical end surface with a cone angle substantially equal to the cone angle of the energizer ring end surface and an outwardly facing annular end surface;

a pair of retainer rings disposed about the stem between which a plurality of packing elements are sandwiched, one of the retainer rings being an inner retainer ring having an inwardly facing annular surface in contiguous relation to the adapter ring, the other retainer ring being an outer retainer ring having an outwardly facing annular surface; and a packing gland nut disposed in contiguous relation to the outer retainer ring and having an externally threaded portion for accommodating its connection with an internally threaded portion of the valve body, the packing gland nut being axially adjustable within the annular space of the valve body for applying an axial force on the packing elements and spring washers such that the spring washers are squeezed until their cone angle matches the cone angle of the energizer ring and adapter ring whereby the spring washers apply a controlled predetermined preload back onto the packing elements to provide a seal between the stem and valve body at low fluid pressures of the flow passage.

* * * * *

UNITED STATES PATENT AND TRADEMARK OFFICE
CERTIFICATE OF CORRECTION

PATENT NO. : 4,516,752

DATED : May 14, 1985

INVENTOR(S) : Brett A. Babbitt
Tri C. Le

It is certified that error appears in the above-identified patent and that said Letters Patent is hereby corrected as shown below:

Column 8, line 25, change "pacing" to -- packing --.

Signed and Sealed this

Eighth Day of October 1985

[SEAL]

Attest:

DONALD J. QUIGG

Attesting Officer

Commissioner of Patents and
Trademarks—Designate